June 17, 1924.

J. O. NASLIN

DOOR CLOSING DEVICE

Filed Feb. 28, 1923   3 Sheets-Sheet 1

1,497,868

INVENTOR
John O. Naslin

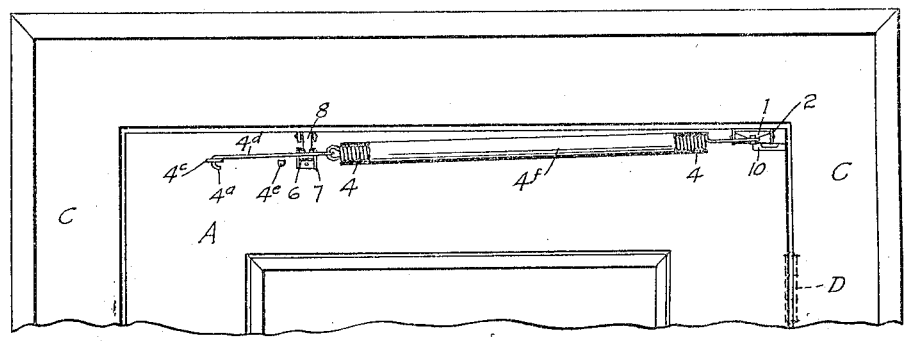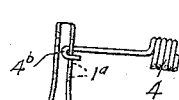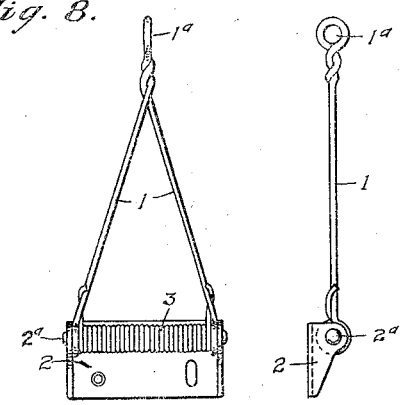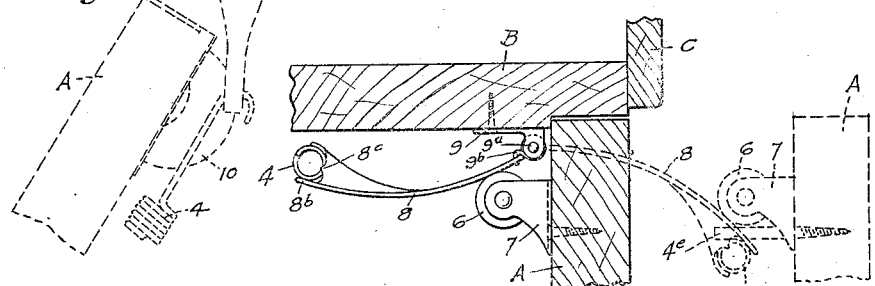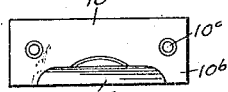

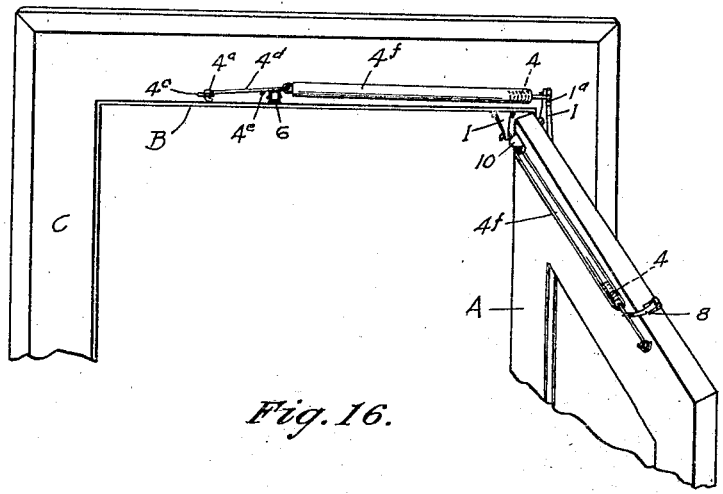
Fig. 16.
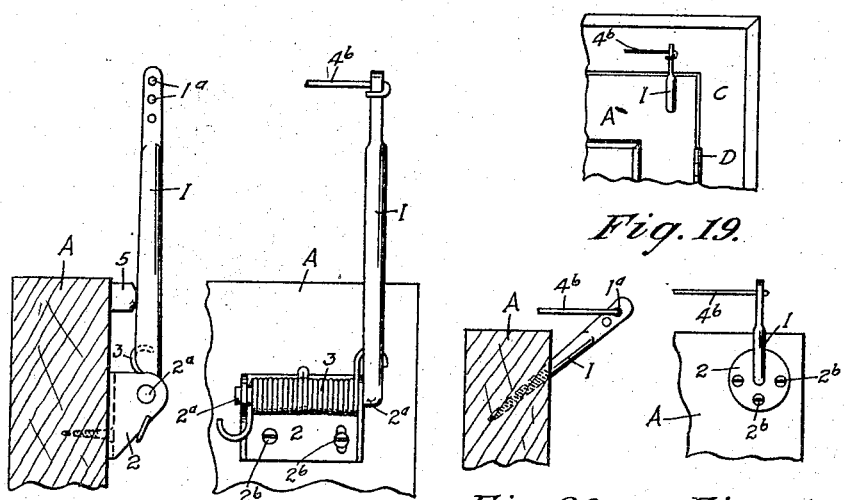
Fig. 17. Fig. 18. Fig. 19.
Fig. 20. Fig. 21.
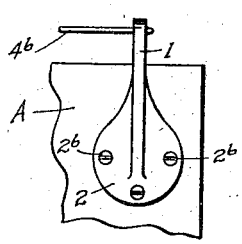
Fig. 23.
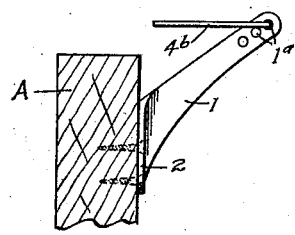
Fig. 24.
Fig. 22.

Patented June 17, 1924.

1,497,868

UNITED STATES PATENT OFFICE.

JOHN O. NASLIN, OF SEATTLE, WASHINGTON.

DOOR-CLOSING DEVICE.

Application filed February 28, 1923. Serial No. 621,849.

*To all whom it may concern:*

Be it known that I, JOHN O. NASLIN, a citizen of the United States, residing at 415 Taylor Avenue, Seattle, in the county of King and State of Washington, have invented a new and useful Door-Closing Device; and I do hereby declare that the following is a full and exact description thereof, reference being had to the accompanying drawings and the characters and references marked thereon.

My invention relates to a door closing device, whereby a door and the like is rendered self-closing; and the objects of the same are, first, to provide means for the automatic closing of a door and the like without slamming and with less spring strain than ordinarily used, second, to provide means for minimizing the spring strain when the door is swung open, third, to provide means for the partial checking of a door, just before it swings to a closed position, and fourth, to provide means that are simple, durable and practical, in that the device can be used on both sides of a door, and for right and left-hand swinging doors, without any change in principle.

Figure 1:
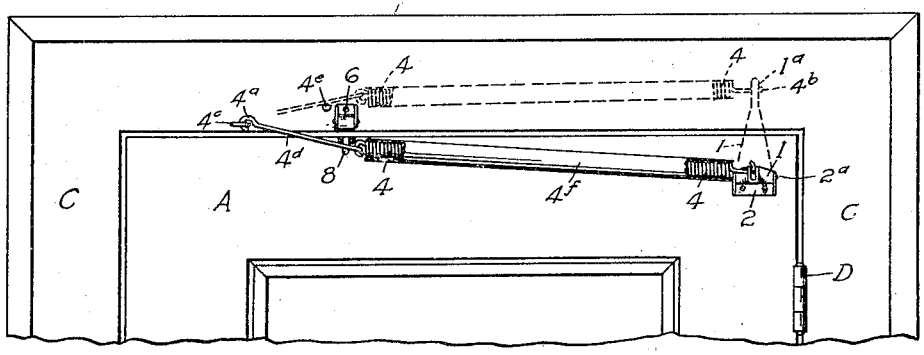
Figure 2:
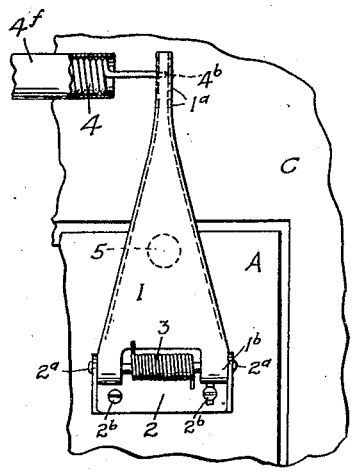
Figure 3:
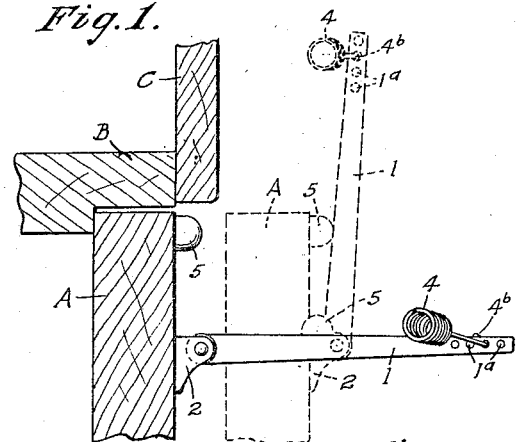
Figure 4:
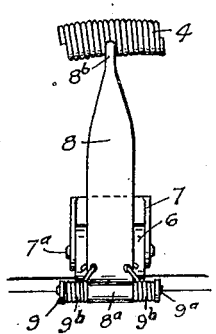
Figure 5:
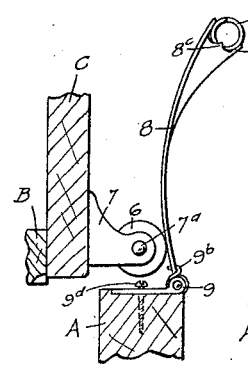
Figures 6, 7:
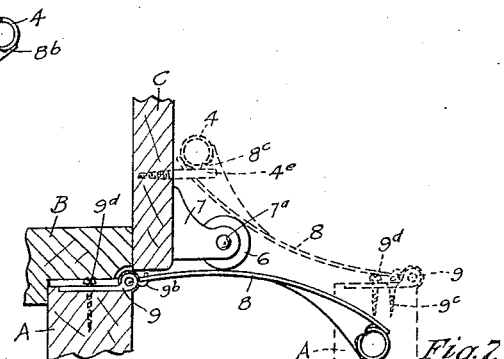

I attain these objects by the combination of the different parts illustrated in the accompanying drawings, wherein—Figure 1 illustrates by solid lines the position of the device, on a hinged side of a door when closed; and illustrates by dotted lines the position thereof, when the door is swung open to the point, where bracket 1 is swung back against the same. Figure 2 illustrates a larger scale of bracket 1, in the same position just mentioned; Figure 3 illustrates by solid lines the position of bracket 1 when the door is closed, as seen from the edge thereof; and illustrates by dotted lines the position of said bracket when the door is swung open, as indicated therein. Figure 4 is a front view of lever 8, raised to a perpendicular position against roller 6, showing spring 4 resting in the crotched end thereof; Figure 5 is a side view of the same in the same position; Figure 6 illustrates by solid lines the position of lever 8, when the door is closed; Figure 7 illustrates by dotted lines the position of the same when the door is swung open enough to position spring 4 upon support $4^e$. Figure 8 illustrates the device positioned on the reverse side of a door, as seen from the front thereof; Figure 9 illustrates the position of the device on the same side of a door, as seen from below; by solid lines when the door is closed, and by dotted lines when the door is swung open, as indicated therein. Figures 10 and 11 are front and side views of bracket 1, showing how the same may be formed out of wire-material; Figure 12 illustrates by solid lines the position of lever 8 when the door is closed, and Figure 13 illustrates by dotted lines the position of the same, where spring 4 rests on support $4^e$; Figures 14 and 15 are front and top views of guard 10. Figure 16 is a perspective of a door and jamb, with door open, and the positions of the device shown on both sides of the door; except that on the side thereof facing the jamb, the lever 8 and roller 6 are not shown. Figures 17 and 18 show simplified forms of constructions of the swinging bracket, as seen from the edge and front of a door; Figures 19 to 24 inclusive, are front and side-views, showing different modes of constructions of the stationary bracket, as hereinafter described.

Similar letters and numerals refer to similar parts throughout the several views.

Letter A indicates a door, letter B a jamb, C a casing and letter D a door hinge.

In the claims, the door is named "hinged part," the jamb and casing "stationary part."

This device consists principally of a spring-bracket, which has a base-part, indicated by 2, adapted to be attached to a door and the like, and a spring-carrying-part, indicated by 1, and adapted for spring-connection. And for the hinged side of a door, that opens only to about a quarter-circle, these two parts may be made in one piece together, but for a bracket that is to be used on doors, that opens farther than as stated, and on either side thereof, a swinging bracket made in two distinct parts is required. Wherefore, I have provided for such a bracket, a base-part, in the form of a hinge 2, (see Figures 2, 3, 10, 11, 17 and 18), with pivot means, as at $2^a$ $2^a$, and holes for screws at $2^b$ $2^b$, by which to fasten said base-part in place. One of said holes being oblong, so that said part can be moved sidewise at that point, for adjustment with respect to its alignment with spring 4 and the side of the door, as may be required. The spring-carrying-part 1 of said bracket, (see last named figures), is swingingly mounted upon the pivot means $2^a$ $2^a$, so as to swing from side to side thereon; and in its swinging end is provided one or more holes, as at 1ª 1ª, to which, by means of a hook 4ᵇ, one end of spring 4 is connected; the other end of which, by means of a hook 4ª is connected to fastening 4ᶜ, so as to render the door self-closing.

When the device is used on the hinged side of a door, the said bracket should be attached to it near the top and hinged edge thereof, so that when spring 4 is connected thereto, as already stated, it will move clear over the top of the door, during the latter's opening and closing movements. I have shown on the drawings how this bracket can be made in various modes of constructions, both for stationary brackets, such as shown in Figures 19 to 22, in the simple form of a pin, inserted into the door, and adapted for spring-connection; and in Figures 23 and 24, in the form of a bracket having a spring-carrying-part adapted for spring-connection, and a base-part attached to a door, as shown therein; and for swinging brackets, such as shown in Figures 2, 3, 9, 10, 11, 17 and 18. From which it may be inferred, that this bracket can be made in various other forms, than as herein described; wherefore, I hereby reserve the right to use all other forms of constructions for said bracket, which involves the same principles as herein shown and described.

A stationary bracket of this kind is, of course, not so practical and useful for all purposes, as the swinging bracket previously described; which can be used on both sides of a door, and will permit of the free opening swing thereof to a full half-circle. And for right and left-hand purposes. To adjust this swinging bracket in proper position, so as to properly function is, nevertheless, a difficult task; particularly when used on the hinged side of a door, as shown in Figures 1 and 2, in that the base-pivot 2ª 2ª, of said bracket, must have a certain alignment with respect to the side of the door and spring-fastening 4ᶜ. For, if the line drawn through the base-pivot 2ª 2ª, runs too high or too far out, with respect to said fastening 4ᶜ, the said bracket will, when the door is swung to a closed position, swing too far out and downward; so that when the door is again swung open, the said bracket may not readily yield to the increasing tension of spring 4, until the latter becomes so strained that, when the said bracket finally yields to the said spring and swings inward, it will strike against the door with a loud clap. If, on the other hand, the line drawn through the said pivot 2ª 2ª, runs, with respect to the direction of said spring and the side of the door, too far inward and downward, the said bracket, when the door moves to a closed position, may not swing out far enough, to form a sufficient projection for spring 4 to insure the proper closing of the door and its retention in a closed position.

But, partly by the use of spring means 3 3, which I have provided upon the base part of said bracket, and partly by lever 8, and guard 10 the said difficulty is minimized. This may be more fully understood from the following: That when the door is closed, while the tension of spring 4 is directed towards the front of the door, the tension of base springs 3 3 is directed transversely thereto, sidewise and outward from the door; wherefore, while the door remains closed, the tension of spring 4 has little or no effect upon the tension of base springs 3 3; hence, as soon as the door reaches towards a closed position, said bracket begins to swing outwards from the door, until it reaches a point about as indicated by solid lines in Figures 3 and 9, at the closing point thereof; and remains in that position until the door is again swung open; and by the increasing tension of spring 4, it is swung inward against stop 5 which may be positioned on bracket 1, or on the door. From these explanations it may also be understood, that this stop 5 has two main objects, namely, to eliminate any noise that may be produced, if said bracket had free swing against the door, and to project said bracket out from the door, so as to render the same self-closing all the way from its closing point to about a half-circle, and so that said bracket may be positioned closer to the hinged side of the door, and still render a more perfect closure of the same, than without such a stop. The difficulty regarding the positioning of this bracket 1, referred to, will be further minimized when the device is used on the opposite side of a door, partly by the positioning of said bracket upon the jamb, instead of upon the door, and partly by the use of a guard 10 positioned upon the door, as indicated in Figures 8 and 9. Where it can be seen how bracket 1 is fastened onto the door jamb, near the side and back edge of the door, so that when the door is swung open to a position, indicated by dotted lines in Figure 9, the bracket has been swung diagonally in the direction of the door to merely clear the edge thereof, and this minimizes the tension of spring 4, when the door is swung open; but increases the tension of said spring, when the door is swung closed, more than when the device is positioned on the opposite side of a door.

Furthermore, said guard 10 is provided with a curved-edge sector-like portion 10ª, and a plate-like portion 10ᵇ; the latter extending some distance outside of said sector, on both sides thereof; which adapts it for right and left-hand use; and by means of screws inserted through holes provided at 10ᶜ 10ᶜ, is fastened onto the door, so that the said plate portion reaches to the edge of the door and forms a wearing protection for same; and so that the sector portion engages and guards bracket 1 and spring 4 away from the edge and side of the door; which is essential for the latter's opening and closing movements.

The said guard serves also as a braking or checking means for the door on its closing course; in that said spring presses quite heavily against said guard, and this checks to some extent the movements of the former; which, however, is dispelled when the door reaches towards the closing point. Where partly by said guard and partly by said spring means 3 3, bracket 1 is moved outward from the door to the position indicated, by solid lines in Figure 9; which, provided said bracket and spring is of proper dimension and in proper positions, is a sufficient pitch for said spring 4, to pull the door closed and hold it closed.

But a lighter spring may serve the same purpose by the use of lever 8 which consists of a swinging arm pivoted to hinge 9, as at $9^a$ and by means of screws secured to the top of the door or the jamb, (see Figures 6, 7, 12 and 13), so that when the former opens and closes, the said lever passes directly under roller 6, which is mounted by means of a bracket 7, as shown in said figures, so that the roller snugly clears the door and said lever. Pivot $9^a$ is longer than the width of the lever, leaving room on both sides thereof for springs $9^b$ $9^b$, which permits the said lever to move back and forth on the pivot, and holds the same against screw $9^d$, whereby the lever can be adjusted so as to engage spring 4, by a fork provided in its swinging end, having a tooth $8^c$, which, when the said fork engages said spring, is forced between the strands of the spring, and thereby prevents the same from slipping back and forth on the fork, during the opening and closing movements of the door; which, if permitted, would produce a snapping noise during such movements. These movements of the spring on the fork are caused by the constant changes in positions of the same and of the door and the lever during the opening and closing of the door. This noise is, however, to some extent lessened by the movements of the lever on the pivot $9^a$, as referred above, or said noise may be eliminated by using a rod-hook $4^d$ for spring 4, to engage said lever, as shown in Figures 1 and 8 for which said lever is adapted. The operation of this lever may be described as follows:

When the door is swung open, spring 4— being positioned on the fork of lever 8—by its tension swings said lever upwards against roller 6, upon which the former turns over and positions spring 4 upon support $4^e$, where the lever leaves it until the door swings back towards the closing point, when the forked end of the lever again engages said spring, and by roller 6 is swung outwards with said spring to a position indicated in Figure 6, when the door is closed.

When the device is used on the opposite side of a door, the operations of these parts are about the same, but their positions on the door and the casing or the door jamb are reversed, so that roller 6, spring 4 and spring support $4^e$ are attached to the door, (see Figures 8, 12 and 13), and bracket 1 and lever 8 are attached to the casing or the jamb, (see Figures 8, 9 and 12).

The means for attaching the ends of spring 4 to the door, the bracket and the casing or jamb, which I have provided are indicated at $4^b$ and $4^d$ in Figures 2, 3, 8 and 9, which I consider practical to use; in that the distance between the points of attachment for the same, must be as nearly correct as possible, wherefore, when a short spring is used, rod-hooks as indicated at $4^b$ and $4^d$ are well adapted; and when used, they, instead the spring would be positioned in the crotch of lever 8, for which it is adapted. If, however, only short hooks are used, such may be formed out of the ends of spring 4, so as to serve the purpose. But I prefer to use, at least in one end of said spring, a rod-hook threaded to match the contracted ends of said spring, as indicated in Figures 2, 3 and 8; whereby, at that end, the tension of said spring may be adjusted, without changing the point of attachment in the other end therof.

What I claim is:

1. In a door closer, a projecting spring bracket having a base part attachable to a hinged part, and a projecting part adapted for spring connection, and spring means connectible to said projecting part and to a stationary part, whereby to render said hinged part self-closing.

2. In a door closer, a projecting spring bracket having a base part positioned upon a hinged part, and a projecting part adapted for spring connection, and a spring connected to said projecting part and to a stationary part, so that when the said hinged part is swung open, the tension of said spring increases, and operates to close the said hinged part.

3. In door closer, a projecting spring bracket having a spring projecting part adapted for spring connection, and a base part attached to a hinged part, near the top and hinged edge thereof, and spring means connected to said projecting part and to a stationary part, and adapted by said parts to move clear over the top of said hinged part, when the latter is swung open, and swung closed by said means.

4. In a door closer, a projecting spring bracket having a swinging part adapted for spring connection, and a base part pivoted thereto and attachable to a hinged part, means for attaching said parts to said hinged part, and spring means attachable to said swinging part and to a stationary part, whereby the said hinged part can be rendered self-closing.

5. In a door closer, a projecting spring bracket having a swinging part adapted for spring connection, and a base part pivoted thereto and positioned upon a hinged part, near the top and hinged edge thereof, spring means connected to said swinging part and to a stationary part, and adapted by said parts so that when the said hinged part is swung open, the said swinging part is swung inward, and when the said hinged part is swung inward to a closed position, the said swinging part its swung outward.

6. In a door closer, a projecting spring bracket having a pivoting base part positioned upon a hinged part, near the top and hinged edge thereof, and a spring-carrying part adapted for spring connection and pivoted to said base part, so as to swing form side to side on said parts, and a spring connected to said spring-carrying part and to a stationary part, whereby when the said hinged part is swung open, the tension of said spring increases, and operates to close said hinged part.

7. In a door closer, a projecting spring bracket having a base part pivoted to a hinged part, near the top and hinged edge thereof, and a swinging part extending from said base part and adapted for spring connection, a spring connected to said swinging part and to a stationary part, and by said parts adapted to move clear over the top of said hinged part, whereby when the said hinged part is swung open, the said swinging part is swung inward, and when the said hinged part is swung to a closed position, the said swinging part is swung outward by said spring; a stop to engage and limit the inward movement of said swinging part, a support for said spring attached to said stationary part, near to the top of said hinged part, a roller axially mounted on said stationary part, near to said support and said hinged part, and a swinging lever pivoted to said hinged part, so as to pass close under said roller, about which said lever is adapted to swing, engage and position said spring, as for the purpose shown and described.

8. In a door closer, a projecting spring bracket having a swinging part adapted for spring connection, and a base part pivoted to said swinging part and positioned upon a hinged part, near the top and hinged edge thereof, a spring connected to said swinging part and to a stationary part, and adapted by said parts to swing clear over the top of said hinged part, whereby the said hinged part is rendered self-closing, a stop for limiting the inward movement of said swinging part, spring means mounted on said base part, whereby said swinging part is swung outward from said hinged part, when the latter is moved to a closed position, and whereby the tension of said spring is increased for the closing movement of said hinged part.

9. In a door closer, a projecting spring bracket having a swinging part adapted for spring connection, and transversely pivoted to a hinged part, near the top and hinged edge thereof, a spring connected to said swinging part and to a stationary part, adapted to render the said hinged part self-closing, spring means for moving said swinging part outward from said hinged part, and means for stopping its inward movement, a support for said spring, a roller positioned adjacent to said support, and a swinging lever pivoted on said hinged part to swing about said roller, and adapted to engage and position said spring on said support, and swing the same spring outward from its normal position aligned with its fastenings, whereby its tension is increased, when the said hinged part is swung to a closed position.

10. In a door closer, a projecting spring bracket having a pivoting base part positioned upon a stationary part near the side and back edge of a hinged part, and a projecting part adapted for spring connection, and pivoted to said base part so as to swing from side to side on said base, a spring connected to said projecting part and to said hinged part, and whereby when the said hinged part is swung open, the said projecting part is swung inwardly towards said hinged part, and when the said hinged part is swung to a closed position, the said projecting part is swung outwardly by said spring, whereby the said hinged part is rendered self-closing.

11. In a door closer, a projecting spring bracket having a projecting part adapted for spring connection, and a pivoted base part positioned upon a stationary part, so as to swing from side to side on said base part, a spring connected to said projecting part and to a hinged part, whereby when the said hinged part is swung open, the tension of said spring increases, and operates to close the said hinged part, means on said hinged part for guarding said projecting part and spring from said hinged part, and spring means on said base part for swinging said projecting part outwardly from said hinged part, during its opening and closing movements.

12. In a door closer, a projecting spring bracket having a swinging part adapted for spring connection and pivoted to a base part mounted upon a stationary part near the side and hinged edge of a hinged part, so as to swing from side to side on said base part, spring means connected to said swinging part and to said hinged part by which said hinged part is rendered self-closing, tension means mounted upon said base part for swinging said swinging part outward from said hinged part, when the latter moves to a closed position, means on said hinged part for guarding said swinging part and spring means from the swing of said hinged part, a support for said spring means on said hinged part, a roller mounted thereon near to said support, and a swinging lever pivoted onto said stationary part, so as to swing about said roller and alternately engage and position said spring means out of its position aligned with its fastenings, when the said hinged part is opened, and when it is swung closed by said spring means.

JOHN O. NASLIN.